US012616079B2

(12) United States Patent
Fujiwara et al.

(10) Patent No.: US 12,616,079 B2
(45) Date of Patent: May 5, 2026

(54) INFORMATION PROCESSING METHOD, NON-TRANSITORY STORAGE MEDIUM, AND INFORMATION PROCESSING DEVICE

(71) Applicant: TOYOTA JIDOSHA KABUSHIKI KAISHA, Aichi-ken (JP)

(72) Inventors: Ryotaro Fujiwara, Tokyo (JP); Hirotada Nakanishi, Toyota (JP); Fuhito Kodama, Nagoya (JP); Yuki Uchida, Iwakura (JP); Satoshi Komamine, Nagoya (JP); Yoshinori Okada, Okazaki (JP); Satoshi Hirano, Obu (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 337 days.

(21) Appl. No.: 18/316,238

(22) Filed: May 12, 2023

(65) Prior Publication Data

US 2023/0363303 A1 Nov. 16, 2023

(30) Foreign Application Priority Data

May 16, 2022 (JP) ................................ 2022-080443

(51) Int. Cl.
| | |
|---|---|
| *A01B 79/00* | (2006.01) |
| *A01B 79/02* | (2006.01) |
| *B64C 39/02* | (2023.01) |
| *B64D 1/18* | (2006.01) |
| *G05D 1/00* | (2006.01) |
| *G06Q 30/0207* | (2023.01) |
| *B64U 101/40* | (2023.01) |

(52) U.S. Cl.
CPC ........... *A01B 79/005* (2013.01); *A01B 79/02* (2013.01); *B64C 39/024* (2013.01); *B64D 1/18* (2013.01); *G05D 1/101* (2013.01); *G06Q 30/0207* (2013.01); *B64U 2101/40* (2023.01); *B64U 2201/10* (2023.01)

(58) Field of Classification Search
CPC ..... A01B 79/005; A01B 79/02; B64C 39/024; B64D 1/18; G05D 1/101; G06Q 30/0207; B64U 2201/10; B64U 2101/40
USPC .......................................................... 702/2
See application file for complete search history.

(56) References Cited

FOREIGN PATENT DOCUMENTS

| | | |
|---|---|---|
| DE | 202022101022 U1 | 3/2022 |
| JP | 2010-086242 A | 4/2010 |
| JP | 2011-045292 A | 3/2011 |

(Continued)

OTHER PUBLICATIONS

English translation of WO 2021/144989, Jul. 22, 2021. (Year: 2021).*

(Continued)

*Primary Examiner* — Michael P Nghiem
(74) *Attorney, Agent, or Firm* — HAUPTMAN HAM, LLP

(57) ABSTRACT

An information processing method is executed by an information processing device configured to decide an execution timing of agricultural chemical spraying by an unmanned aerial vehicle. The information processing method includes acquiring information about each of a plurality of farm fields and deciding an execution timing of agricultural chemical spraying over a first farm field to be sprayed by the unmanned aerial vehicle based on information about a second farm field located around the first farm field.

20 Claims, 6 Drawing Sheets

(56)        References Cited

FOREIGN PATENT DOCUMENTS

| | | | | |
|---|---|---|---|---|
| KR | 10-2005-0018337 | A | 2/2005 | |
| KR | 10-2020-0065696 | A | 6/2020 | |
| KR | 10-2021-0012614 | A | 2/2021 | |
| WO | WO-2014091778 | A1 * | 6/2014 | ............ G06Q 10/06 |
| WO | 2021/140657 | A1 | 7/2021 | |
| WO | WO-2021144989 | A1 * | 7/2021 | ............. A01M 7/00 |

OTHER PUBLICATIONS

Lee, The safe use manual of the manless aerosprayer, National Institute of Agricultural Sciences, Dec. 30, 2018, 152pp.

* cited by examiner

START

ACQUIRE INFORMATION ABOUT PLURALITY OF FARM FIELDS — S100

ACQUIRE RESERVATION INFORMATION FOR SPRAYING AGRICULTURAL CHEMICAL OVER FIRST FARM FIELD — S101

SPECIFY SECOND FARM FIELD LOCATED AROUND FIRST FARM FIELD — S102

DECISION PROCESS — S103

DECIDE AND NOTIFY OF OPERATION PLAN OF UNMANNED AERIAL VEHICLE — S104

END

FIG. 4

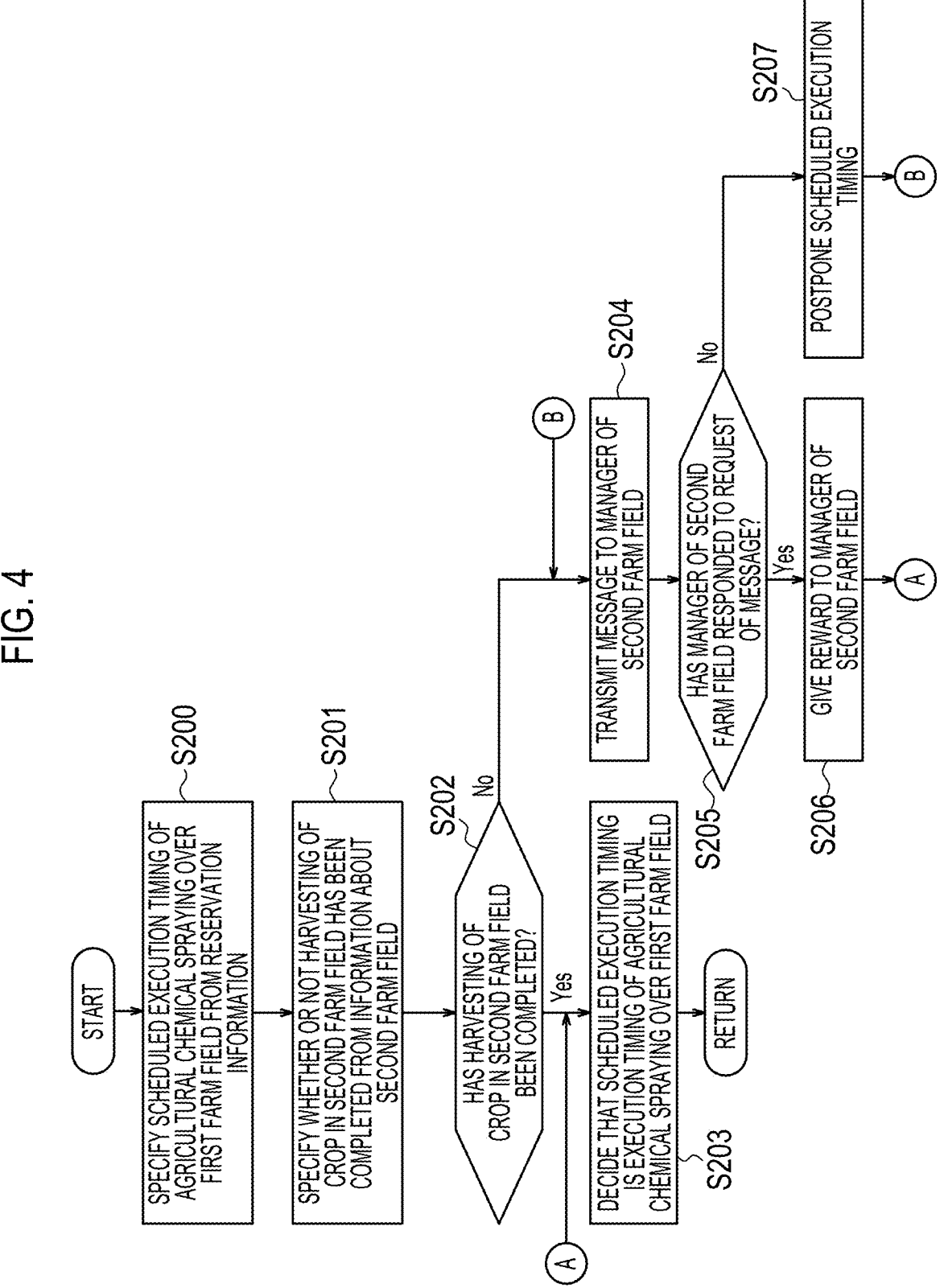

START

SPECIFY SCHEDULED EXECUTION TIMING OF AGRICULTURAL CHEMICAL SPRAYING OVER FIRST FARM FIELD FROM RESERVATION INFORMATION ~S200

SPECIFY WHETHER OR NOT HARVESTING OF CROP IN SECOND FARM FIELD HAS BEEN COMPLETED FROM INFORMATION ABOUT SECOND FARM FIELD ~S201

S202 HAS HARVESTING OF CROP IN SECOND FARM FIELD BEEN COMPLETED?

No

Yes

A

DECIDE THAT SCHEDULED EXECUTION TIMING IS EXECUTION TIMING OF AGRICULTURAL CHEMICAL SPRAYING OVER FIRST FARM FIELD S203

RETURN

B

TRANSMIT MESSAGE TO MANAGER OF SECOND FARM FIELD ~S204

S205 HAS MANAGER OF SECOND FARM FIELD RESPONDED TO REQUEST OF MESSAGE?

No

Yes

GIVE REWARD TO MANAGER OF SECOND FARM FIELD S206

A

POSTPONE SCHEDULED EXECUTION TIMING ~S207

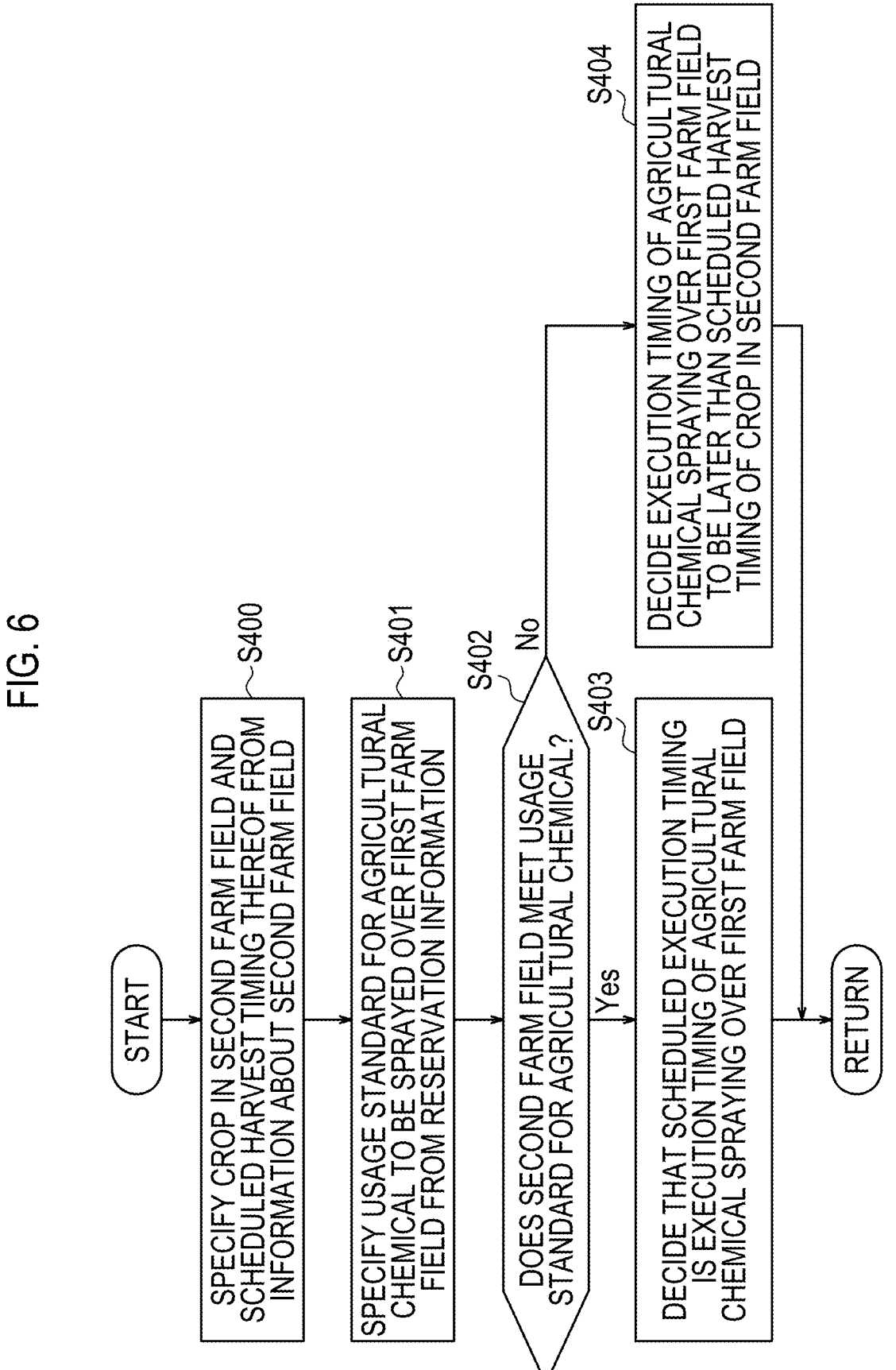

START

SPECIFY CROP IN SECOND FARM FIELD AND SCHEDULED HARVEST TIMING THEREOF FROM INFORMATION ABOUT SECOND FARM FIELD ∼S400

SPECIFY USAGE STANDARD FOR AGRICULTURAL CHEMICAL TO BE SPRAYED OVER FIRST FARM FIELD FROM RESERVATION INFORMATION ∼S401

DOES SECOND FARM FIELD MEET USAGE STANDARD FOR AGRICULTURAL CHEMICAL? S402

Yes

No

DECIDE THAT SCHEDULED EXECUTION TIMING IS EXECUTION TIMING OF AGRICULTURAL CHEMICAL SPRAYING OVER FIRST FARM FIELD S403

DECIDE EXECUTION TIMING OF AGRICULTURAL CHEMICAL SPRAYING OVER FIRST FARM FIELD TO BE LATER THAN SCHEDULED HARVEST TIMING OF CROP IN SECOND FARM FIELD S404

RETURN

INFORMATION PROCESSING METHOD, NON-TRANSITORY STORAGE MEDIUM, AND INFORMATION PROCESSING DEVICE

CROSS-REFERENCE TO RELATED APPLICATION

This application claims priority to Japanese Patent Application No. 2022-080443 filed on May 16, 2022, incorporated herein by reference in its entirety.

BACKGROUND

1. Technical Field

The disclosure relates to an information processing method, a non-transitory storage medium, and an information processing device.

2. Description of Related Art

The technique of spraying an agricultural chemical over a farm field by using an unmanned aerial vehicle, such as a drone, is known. For example, WO 2021/140657 discloses that when a drone is flown along a flight route including an edge route and a central route over a farm field, control is executed such that a flight altitude of the edge route is lower than a flight altitude of the central route.

SUMMARY

There is room for improvement in the technique of spraying an agricultural chemical over a farm field by using an unmanned aerial vehicle. For example, when an agricultural chemical sprayed over a certain farm field is scattered to other surrounding farm fields, the scattered agricultural chemical may adversely affect crops in the other farm fields.

The disclosure is to improve the technique of spraying an agricultural chemical over a farm field using unmanned aerial vehicles.

A first aspect of the disclosure relates to an information processing method executed by an information processing device configured to decide an execution timing of agricultural chemical spraying by an unmanned aerial vehicle. The information processing method includes acquiring information about each of a plurality of farm fields and deciding an execution timing of agricultural chemical spraying over a first farm field to be sprayed by the unmanned aerial vehicle based on information about a second farm field located around the first farm field.

In the first aspect of the disclosure, the information processing method may further include acquiring information indicating a scheduled execution timing of agricultural chemical spraying over the first farm field by the unmanned aerial vehicle. The information about each of the farm field may include information indicating whether or not harvesting of a crop in the farm field has been completed, and the information processing device may be configured to decide that the scheduled execution timing is the execution timing of agricultural chemical spraying over the first farm field by the unmanned aerial vehicle when harvesting of a crop in the second farm field has been completed.

In the first aspect of the disclosure, the information processing method may further include transmitting, to a manager of the second farm field, a message requesting that harvesting of the crop in the second farm field is to be completed before the scheduled execution timing when harvesting of the crop in the second farm field has not been completed.

In the first aspect of the disclosure, the information processing method may further include giving a reward to the manager of the second farm field when the manager of the second farm field responds to a request of the message.

In the first aspect of the disclosure, the information about each of the farm fields may include information indicating a scheduled harvest timing of a crop in the farm field, and the information processing device may be configured to decide the execution timing of agricultural chemical spraying over the first farm field by the unmanned aerial vehicle to be later than a scheduled harvest timing of a crop in the second farm field.

In the first aspect of the disclosure, the information processing method may further include acquiring information indicating a crop for which an agricultural chemical to be sprayed over the first farm field is usable, the information about each of the farm fields may include information indicating the crop in the farm field, and the information processing device may be configured to decide the execution timing of agricultural chemical spraying over the first farm field by the unmanned aerial vehicle to be later than the scheduled harvest timing of the crop in the second farm field when the crop in the second farm field does not correspond to the crop for which the agricultural chemical is usable.

In the first aspect of the disclosure, the information processing method may further include acquiring information indicating a scheduled execution timing of agricultural chemical spraying over the first farm field by the unmanned aerial vehicle and information indicating a timing when an agricultural chemical to be sprayed over the first farm field is usable for the crop, and the information processing device may be configured to decide the execution timing of agricultural chemical spraying over the first farm field by the unmanned aerial vehicle to be later than the scheduled harvest timing of the crop in the second farm field when the scheduled execution timing does not correspond to the timing when the agricultural chemical is usable for the crop in the second farm field.

A second aspect of the disclosure relates to a non-transitory storage medium storing instructions. The instructions are executable by one or more processors in an information processing device configured to decide an execution timing of agricultural chemical spraying by an unmanned aerial vehicle and cause the one or more processors to perform the following functions. The functions include acquiring information about each of a plurality of farm fields and deciding an execution timing of agricultural chemical spraying over a first farm field to be sprayed by the unmanned aerial vehicle based on information about a second farm field located around the first farm field.

In the second aspect of the disclosure, the functions may further include acquiring information indicating a scheduled execution timing of agricultural chemical spraying over the first farm field by the unmanned aerial vehicle on the information processing device, the information about each of the farm fields may include information indicating whether or not harvesting of a crop in the farm field has been completed, and the one or more processors may be configured to decide that the scheduled execution timing is the execution timing of agricultural chemical spraying over the first farm field by the unmanned aerial vehicle when harvesting of a crop in the second farm field has been completed.

In the second aspect of the disclosure, the functions may further include transmitting, to a manager of the second farm field, a message requesting that harvesting of the crop in the second farm field is to be completed before the scheduled execution timing when harvesting of the crop in the second farm field has not been completed.

In the second aspect of the disclosure, the functions may further include giving a reward to the manager of the second farm field when the manager of the second farm field responds to a request of the message.

In the second aspect of the disclosure, the information about each of the farm fields may include information indicating a scheduled harvest timing of a crop in the farm field, and the one or more processors may be configured to decide the execution timing of agricultural chemical spraying over the first farm field by the unmanned aerial vehicle to be later than a scheduled harvest timing of a crop in the second farm field.

In the second aspect of the disclosure, the functions may further include acquiring information indicating a crop for which an agricultural chemical to be sprayed over the first farm field is usable, the information about each of the farm fields may include information indicating the crop in the farm field, and the one or more processors may be configured to decide the execution timing of agricultural chemical spraying over the first farm field by the unmanned aerial vehicle to be later than the scheduled harvest timing of the crop in the second farm field when the crop in the second farm field does not correspond to the crop for which the agricultural chemical is usable.

In the second aspect of the disclosure, the functions may further include acquiring information indicating a scheduled execution timing of agricultural chemical spraying over the first farm field by the unmanned aerial vehicle and information indicating a timing when an agricultural chemical to be sprayed over the first farm field is usable for the crop, and the one or more processors may be configured to decide the execution timing of agricultural chemical spraying over the first farm field by the unmanned aerial vehicle to be later than the scheduled harvest timing of the crop in the second farm field when the scheduled execution timing does not correspond to the timing when the agricultural chemical is usable for the crop in the second farm field.

A third aspect of the disclosure relates to an information processing device configured to decide an execution timing of agricultural chemical spraying by an unmanned aerial vehicle, and including a processor. The processor is configured to acquire information about each of a plurality of farm fields and decide an execution timing of agricultural chemical spraying over a first farm field to be sprayed by the unmanned aerial vehicle based on information about a second farm field located around the first farm field.

In the third aspect of the disclosure, the information about each of the farm fields may include information indicating whether or not harvesting of a crop in the farm field has been completed, the processor may be configured to acquire information indicating a scheduled execution timing of agricultural chemical spraying over the first farm field by the unmanned aerial vehicle, and the processor may be is configured to decide that the scheduled execution timing is the execution timing of agricultural chemical spraying over the first farm field by the unmanned aerial vehicle when harvesting of a crop in the second farm field has been completed.

In the third aspect of the disclosure, the processor may be configured to transmit, to a manager of the second farm field, a message requesting that harvesting of the crop in the second farm field is to be completed before the scheduled execution timing via a communicator when harvesting of the crop in the second farm field has not been completed.

In the third aspect of the disclosure, the processor may be configured to execute a process of giving a reward to the manager of the second farm field when the manager of the second farm field responds to a request of the message.

In the third aspect of the disclosure, the information about each of the farm fields may include information indicating a scheduled harvest timing of a crop in the farm field, and the processor may be configured to decide the execution timing of agricultural chemical spraying over the first farm field by the unmanned aerial vehicle to be later than a scheduled harvest timing of a crop in the second farm field.

In the third aspect of the disclosure, the information about each of the farm fields may include information indicating the crop in the farm field, the processor may be configured to acquire information indicating a crop for which an agricultural chemical to be sprayed over the first farm field is usable, and the processor may be configured to decide the execution timing of agricultural chemical spraying over the first farm field by the unmanned aerial vehicle to be later than the scheduled harvest timing of the crop in the second farm field when the crop in the second farm field does not correspond to the crop for which the agricultural chemical is usable.

According to the aspects of the disclosure, the technique of spraying an agricultural chemical over a farm field by using an unmanned aerial vehicle can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart showing a first example of a decision process executed by the information processing device;

FIG. 6 is a flowchart showing a third example of the decision process executed by the information processing device.

DETAILED DESCRIPTION OF EMBODIMENTS

An embodiment of the disclosure will be described below.

Overview of Embodiment

Figure 1:
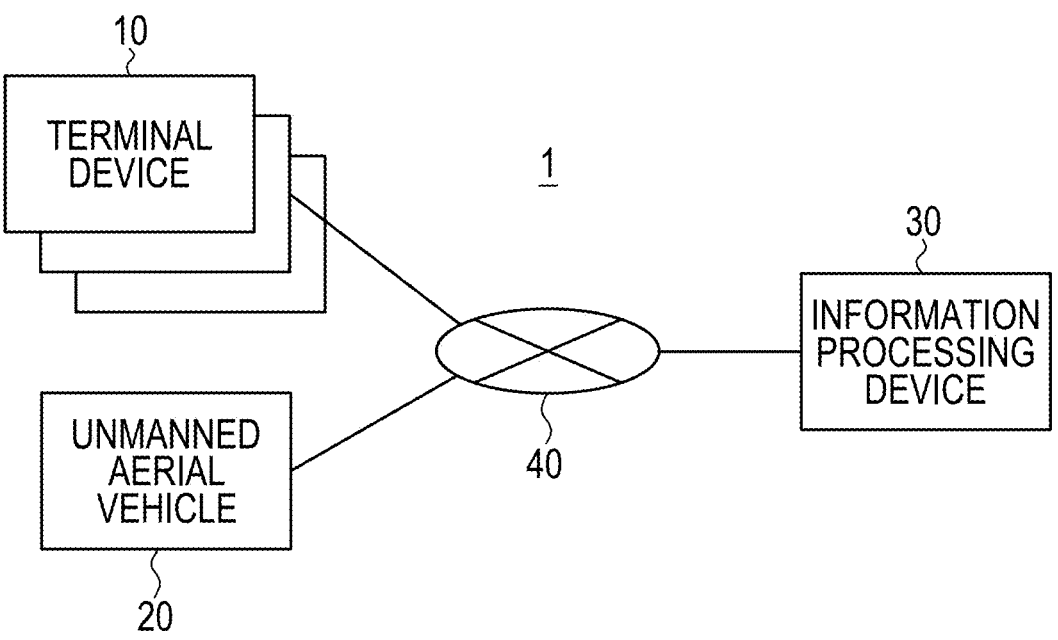
FIG. 1 is a block diagram showing a schematic configuration of a system according to an embodiment of the disclosure.

An overview of a system 1 according to an embodiment of the disclosure will be described with reference to FIG. 1. The system 1 includes a plurality of terminal devices 10, an unmanned aerial vehicle 20, and an information processing device 30. The information processing device 30 can communicate with each of the terminal device 10 and the unmanned aerial vehicle 20 via a network 40 including, for example, the Internet and a mobile communication network.

The terminal device 10 is, for example, a computer, such as a personal computer (PC), a smartphone, or a tablet terminal. In the present embodiment, the terminal device 10 is used by a farm field manager, such as a farmer. Each terminal device 10 can be used, for example, by a manager of a different farm field. In one example, a manager of each farm field acquires in advance a user account to be used in the system 1. The manager of the farm field can operate the terminal device 10 to execute a login process and then make a reservation for agricultural chemical spraying over a specified farm field by the unmanned aerial vehicle 20.

The unmanned aerial vehicle 20 is any aircraft without people on board. An aircraft, such as a drone or multicopter, can be employed as the unmanned aerial vehicle 20, for example. In the present embodiment, the unmanned aerial vehicle 20 is used, for example, by an agent who sprays an agricultural chemical on behalf of the manager of the farm field. The unmanned aerial vehicle 20 is equipped with a spraying device for spraying an agricultural chemical from the sky toward the ground, and can spray the agricultural chemical over a farm field from the sky autonomously or in cooperation with the information processing device 30. For example, the unmanned aerial vehicle 20 can automatically spray an agricultural chemical at a specified timing over a farm field specified to be sprayed according to an operation plan notified from the information processing device 30. Preliminary works for agricultural chemical spraying, such as charging the battery provided in the unmanned aerial vehicle 20 and replenishing the agricultural chemical to the spraying device, may be executed by the manager of the farm field or the agricultural chemical spraying agent.

The information processing device 30 is, for example, a computer, such as a PC, a smartphone, a tablet terminal, or a server. The information processing device 30 can communicate with each of the terminal devices 10 and the unmanned aerial vehicle 20 via the network 40. In the present embodiment, the information processing device 30 is used, for example, by the agricultural chemical spraying agent. In one example, when the information processing device 30 receives a reservation for agricultural chemical spraying over the farm field from the manager of the farm field, the information processing device 30 decides an operation plan for the unmanned aerial vehicle 20 according to the contents of the reservation, and notifies the unmanned aerial vehicle 20 of the operation plan, thereby causing the unmanned aerial vehicle 20 to spray the agricultural chemical over the farm field.

First, an outline of the present embodiment will be described, and details will be described later. For each of a plurality of farm fields, the information processing device 30 acquires information about the farm field. Then, the information processing device 30 decides an execution timing of agricultural chemical spraying over a first farm field to be sprayed with an agricultural chemical (hereinafter also referred to as 'first farm field') by the unmanned aerial vehicle 20, based on information about another farm field located around the first farm field (hereinafter also referred to as 'second farm field').

According to the present embodiment, the execution timing of agricultural chemical spraying over the first farm field by the unmanned aerial vehicle 20 is decided based on the information about the second farm field. For example, when the decision is made that the execution timing of agricultural chemical spraying over the first farm field is to come, for example, after harvesting of the crop in the second farm field has been completed or later than a scheduled harvest timing of the crop in the second farm field, the probability that the scattered agricultural chemical adheres to the crop in the second farm field is reduced. Therefore, according to the present embodiment, even when the agricultural chemical sprayed over the first farm field by the unmanned aerial vehicle 20 is scattered to the second farm field, the probability that the scattered agricultural chemical adversely affects the crop in the second farm field is reduced and, in this respect, the technique of spraying an agricultural chemical over a farm field by using unmanned aerial vehicles 20 is improved.

Next, the configuration of the information processing device 30 included in the system 1 will be described in detail.

Configuration of Information Processing Device

Figure 2:
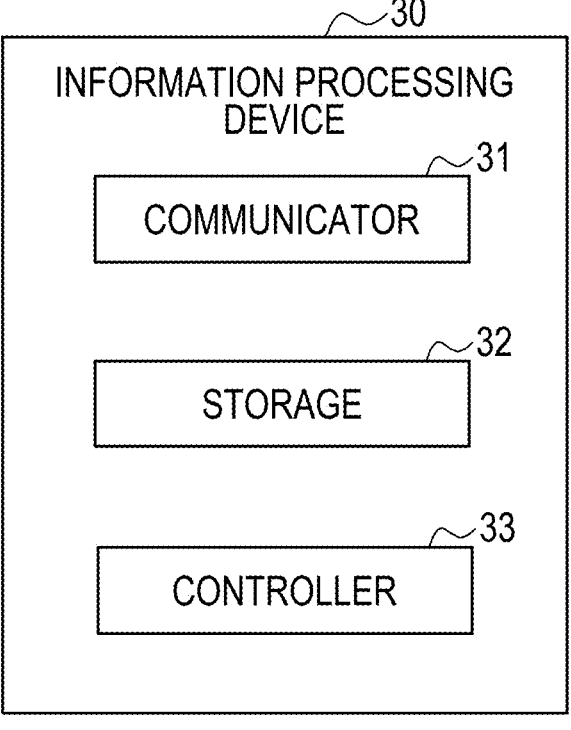
FIG. 2 is a block diagram showing a schematic configuration of an information processing device.

As shown in FIG. 2, the information processing device 30 includes a communicator 31, a storage 32 and a controller 33.

The communicator 31 includes one or more communication interfaces for connecting to network 40. The communication interface corresponds to, for example, a mobile communication standard, such as 4th generation (4G) or 5th generation (5G), a wired local area network (LAN) standard, or a wireless LAN standard, but is not limited thereto, may correspond to any communication standard. In the present embodiment, the information processing device 30 communicates with the terminal devices 10 and the unmanned aerial vehicle 20 via the communicator 31 and the network 40.

The storage 32 includes one or more memories. The memory is, for example, a semiconductor memory, a magnetic memory, an optical memory, or the like, but is not limited thereto. Each memory included in the storage 32 may function, for example, as a main storage device, an auxiliary storage device, or a cache memory. The storage 32 stores any information used for the operation of the information processing device 30. For example, the storage 32 may store system programs, application programs, built-in software, databases, and the like.

The controller 33 includes one or more processors, one or more programmable circuits, one or more dedicated circuits, or a combination thereof. The processor is, for example, a general-purpose processor, such as a central processing unit (CPU) or a graphics processing unit (GPU), or a dedicated processor specialized for specific processing, but is not limited thereto. The programmable circuit is, for example, a field-programmable gate array (FPGA), but is not limited thereto. The dedicated circuit is, for example, an application specific integrated circuit (ASIC), but is not limited thereto. The controller 33 controls the operation of the information processing device 30 as a whole.

Operation Procedure of Information Processing Device

Figure 3:
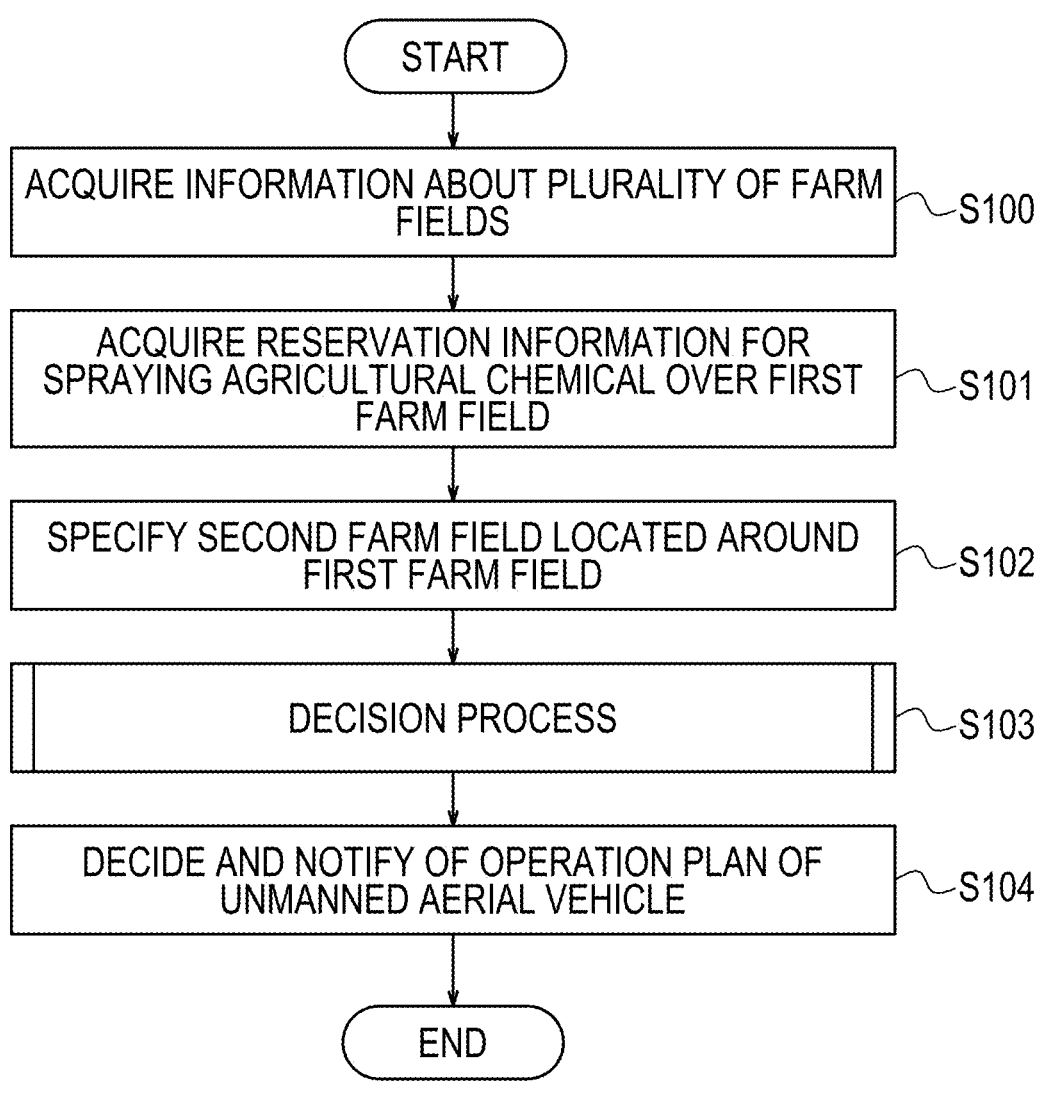
FIG. 3 is a flowchart showing operations of the information processing device.

Operations of the information processing device 30 will be described with reference to FIG. 3. As an outline, the operations are operations for deciding an operation plan of the unmanned aerial vehicle 20 for spraying an agricultural chemical in accordance with a reservation made by the manager of the farm field.

Step S100: The controller 33 of the information processing device 30 acquires information about each of a plurality of farm fields.

Specifically, the manager of each farm field inputs information about the farm field into the terminal device 10. The controller 33 of the information processing device 30 receives information about each farm field from each terminal device 10 via the communicator 31 and stores the information in the storage 32. However, any method can be employed to acquire information about the farm field, without being limited to the above example.

Here, the "information about the farm field" can include, for example, the user account of the manager of the farm field, identification information for the farm field, information indicating the position of the farm field, whether or not harvesting of the crop in the farm field have been completed, the scheduled harvest timing, the crop in the farm field, and the like, but is not limited thereto, and may include any information about the farm field. The information indicating "whether or not harvesting has been completed" is, for example, a flag indicating completion or incompletion of harvesting, information indicating the date and time of completion of harvesting, or the like, but is not limited thereto. In addition, "timing" may mean a "period" that has a temporal length, or may mean a "point in time" that does not have a temporal length.

Step S101: The controller 33 acquires reservation information for spraying an agricultural chemical over the first farm field by the unmanned aerial vehicle 20.

Specifically, the manager of a certain farm field (first farm field) inputs reservation information for spraying an agricultural chemical over the first farm field by the unmanned aerial vehicle 20 into the terminal device 10. The terminal device 10 transmits the input reservation information to the information processing device 30. The controller 33 of the information processing device 30 receives the reservation information from the terminal device 10 via the communicator 31 and stores the received reservation information in the storage 32. However, acquisition of reservation information is not limited to the above example, and any method can be employed.

Here, the "reservation information" may include, for example, information indicating a scheduled execution timing of agricultural chemical spraying, an agricultural chemical to be used, and a usage standard for the agricultural chemical, but is not limited thereto, and may include any information needed to make a reservation for a spraying agricultural chemical over the first farm field by the unmanned aerial vehicle 20. For example, the reservation information may further include information specifying an area to be sprayed with the agricultural chemical in the first farm field. Here, the "usage standard for the agricultural chemical" is, for example, a crop for which an agricultural chemical is usable (that is, crop suitable for the use of the agricultural chemical) and a timing (for example, 24 hours or more before harvesting), but is not limited thereto. The usage standard for the agricultural chemical may be stipulated by law, for example.

Step S102: The controller 33 specifies the second farm field located around the first farm field.

Specifically, the controller 33 extracts the position of each farm field from the information about each farm field stored in the storage 32 in step S100, and specifies, for example, another farm field located within a predetermined distance from the first farm field as the second farm field.

Step S103: The controller 33 executes a decision process of deciding an execution timing of agricultural chemical spraying over the first farm field by the unmanned aerial vehicle 20 based on the information about the second farm field.

By executing the decision process, the execution timing of agricultural chemical spraying over the first farm field by the unmanned aerial vehicle 20 is decided. A specific example of the decision process will be described later, but as an outline, an appropriate execution timing is decided such that the adverse effect of the scattered agricultural chemical on the crop in the second farm field is reduced even when the agricultural chemical sprayed by the unmanned aerial vehicle 20 is scattered up to the second farm field. Therefore, in some cases, the execution timing decided by the decision process may not match the scheduled execution timing indicated in the reservation information in step S101.

Step S104: The controller 33 decides an operation plan for the unmanned aerial vehicle 20 based on the reservation information in step S101 and the execution timing of spraying decided in step S103, and notifies the unmanned aerial vehicle 20 of the operation plan.

Specifically, the controller 33 decides the operation plan of the unmanned aerial vehicle 20 to spray the agricultural chemical indicated in the reservation information on the first farm field at the execution timing decided in step S103, and notifies the unmanned aerial vehicle 20 via the communicator 31. Then, the unmanned aerial vehicle 20 automatically sprays the agricultural chemical over the first farm field according to the operation plan of which the unmanned aerial vehicle 20 has been notified.

First Example of Decision Process

A first example of the decision process in step S103 described above will be described with reference to FIG. 4. As an outline, in the first example, the execution timing of agricultural chemical spraying over the first farm field is decided after harvesting of the crop in the second farm field has been completed. In the first example, it is assumed that the reservation information includes information indicating the scheduled execution timing of agricultural chemical spraying. Information about each farm field includes information indicating whether or not the crop in the farm field has been harvested.

Step S200: The controller 33 specifies the scheduled execution timing of agricultural chemical spraying over the first farm field by the unmanned aerial vehicle 20 from the reservation information in step S101 described above.

Step S201: The controller 33 specifies whether or not harvesting of the crop in the second farm field has been completed from the information about the second farm field stored in the storage 32.

Step S202: The controller 33 determines whether or not harvesting of the crop in the second farm field has been completed. When the determination is made that the harvesting has been completed (Yes in step S202), the process proceeds to step S203. On the other hand, when the determination is made that the harvesting has not been completed (No in step S202), the process proceeds to step S204.

Specifically, the controller 33 determines that harvesting of the crop in the second farm field has been completed when the information about the second farm field includes information indicating that the harvesting has been completed. On the other hand, the controller 33 determines that harvesting of the crop in the second farm field has not been completed when the information about the second farm field does not include information indicating that the harvesting has been completed, or when the information about the second farm field includes information indicating that the harvesting has not been completed.

Step S203: When the determination in step S202 is made that the harvesting has been completed (Yes in step S202), the controller 33 decides that the scheduled execution timing is the execution timing of agricultural chemical spraying over the first farm field by the unmanned aerial vehicle 20. Then, the process proceeds to step S104 as described above.

It should be noted that the operation of step S203 may be executed after the scheduled execution timing is postponed in step S207, as will be described later. Therefore, in some cases, the "scheduled execution timing" in step S203 may not match the scheduled execution timing indicated in the reservation information in step S101.

Step S204: when the determination in step S202 is made that the harvesting has not been completed (No in step S202), the controller 33 transmits a message requesting the manager of the second farm field to complete to harvest the crop in the second farm field before the scheduled execution timing.

Specifically, the controller 33 specifies the user account of the manager of the second farm field from the information about the second farm field, and transmits a message regarding the user account. The manager of the second farm field can confirm the message using the terminal device 10.

Step S205: The controller 33 determines whether or not the manager of the second farm field has responded to the request of the message in step S204 (that is, whether or not the manager of the second farm field has completed to harvest the crop in the second farm field before the scheduled execution timing). When the determination is made that the manager of the second farm field has responded to the request (Yes in step S205), the process proceeds to step S206. On the other hand, when the determination is made that the manager of the second farm field has not responded to the request (No in step S205), the process proceeds to step S207.

Specifically, the manager of the second farm field confirms the message in step S204. When the manager of the second farm field responds to the request of the message, the manager of the second farm field completes to harvest the crop in the second farm field before the scheduled execution timing, and inputs information indicating that the harvesting has been completed into the terminal device 10. The terminal device 10 returns the input information to the information processing device 30. When the information is received from the terminal device 10 via the communicator 31, the controller 33 of the information processing device 30 determines that the manager of the second farm field has responded to the request. Further, the controller 33 updates the information about the second farm field stored in the storage 32 to indicate that the harvesting has been completed.

On the other hand, when the manager of the second farm field does not respond to the request of the message, the manager of the second farm field inputs information indicating that the manager of the second farm field will not respond to the request to the terminal device 10. Here, the manager of the second farm field may further input a scheduled harvest timing of the crop in the second farm field to the terminal device 10. The terminal device 10 returns the input information to the information processing device 30. When the information is received from the terminal device 10 via the communicator 31, the controller 33 of the information processing device 30 determines that the manager of the second farm field has not responded to the request.

When there is no return from the terminal device 10 of the manager of the second farm field within a predetermined period before the scheduled execution timing, the controller 33 may determine that the manager of the second farm field has not responded to the request.

Step S206: When the determination in step S205 is made that the manager of the second farm field has responded to the message request (Yes in step S205), the controller 33 gives a reward to the manager of the second farm field. Then, the process proceeds to step S203.

Specifically, the controller 33 gives a reward to the user account of the manager of the second farm field. Here, the "reward" is, for example, data such as electronic money, cryptocurrency, or electronic coupon, but is not limited thereto.

It should be noted that the operations of steps S204 to S206 may be executed after the scheduled execution timing is postponed in step S207, as will be described later. Therefore, in some cases, the "scheduled execution timing" in steps S204 to S206 may not match the scheduled execution timing indicated in the reservation information in step S101. That is, when the scheduled execution timing indicated in the reservation information in step S101 is T1, and the scheduled execution timing when the determination in step S205 is made that the manager of the second farm field has responded to the request of the message is T2, in some cases, T2 may be later than T1. Therefore, in giving a reward to the manager of the second farm field in step S206, for example, when T1 and T2 match, the controller 33 may increase the reward to be given more than when T2 is later than T1. Alternatively, the controller 33 may reduce the reward to be given as the difference between T1 and T2 increases. In any case, the manager of the second farm field can obtain the maximum reward by completing to harvest the crop in the second farm field by T1, which is the scheduled execution timing indicated in the reservation information (that is, the scheduled execution timing of agricultural chemical spraying that is desired by the manager of the first farm field). Therefore, the probability that harvesting of the crop in the second farm field has been completed by T1 increases.

Step S207: When the determination in step S205 is made that the manager of the second farm field has not responded to the request of the message (No in step S205), the controller 33 postpones the scheduled execution timing. Then, the process returns to step S204.

As described above, according to the decision process according to the first example, the execution timing of agricultural chemical spraying over the first farm field is decided after the determination in step S202 or step S205 is made that harvesting of the crop in the second farm field has been completed. That is, in the first example, the execution timing of agricultural chemical spraying over the first farm field is decided after harvesting of the crop in the second farm field has been completed. Therefore, even when the agricultural chemical sprayed over the first farm field by the unmanned aerial vehicle 20 is scattered to the second farm field, the probability that the scattered agricultural chemical adheres to the crop in the second farm field is reduced.

Second Example of Decision Process

Figure 5:
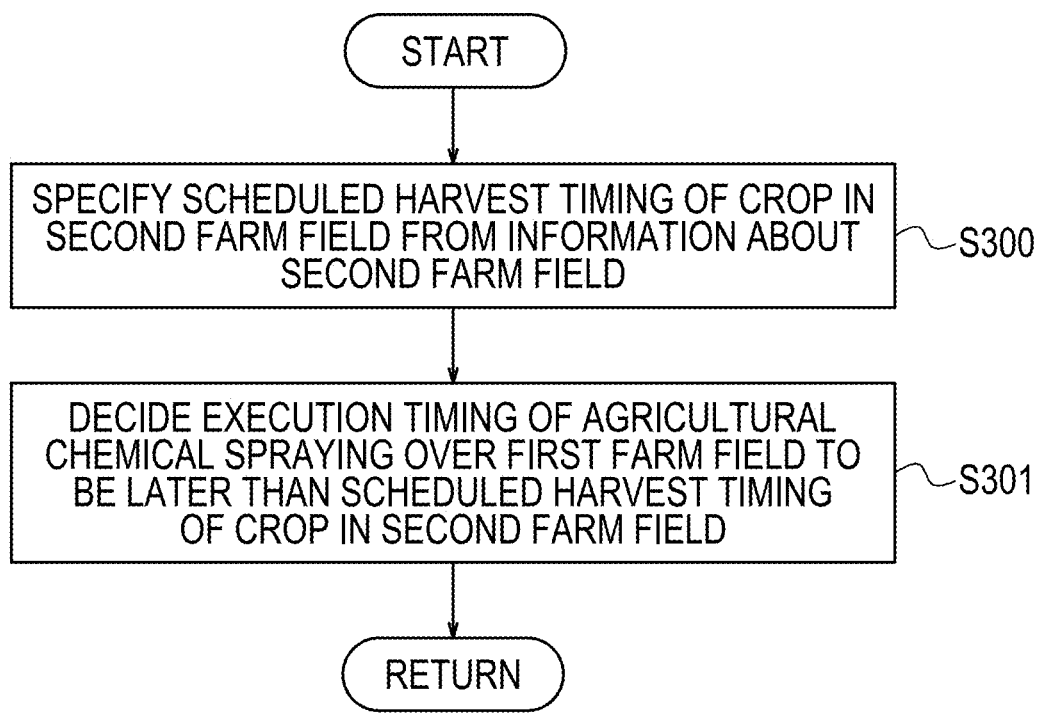
FIG. 5 is a flowchart showing a second example of the decision process executed by the information processing device.

A second example of the decision process in step S103 described above will be described with reference to FIG. 5. In the second example, it is assumed that the reservation information does not need to include information indicating the scheduled execution timing of agricultural chemical spraying, unlike in the first example described above. In addition, the information about each farm field includes information indicating the scheduled harvest timing of the crop in the farm field.

Step S300: The controller 33 specifies a scheduled harvest timing of the crop in the second farm field from the information about the second farm field stored in the storage 32.

Step S301: The controller 33 decides the execution timing of agricultural chemical spraying over the first farm field by the unmanned aerial vehicle 20 to be later than the scheduled harvest timing specified in step S300. Then, the process proceeds to step S104 as described above.

As described above, according to the decision process of the second example, the execution timing of agricultural chemical spraying over the first farm field is decided to be later than the scheduled harvest timing of the crop in the second farm field. Therefore, there is a high probability that harvesting of the crop in the second farm field have been completed before the agricultural chemical is sprayed over the first farm field, and thus, even when the agricultural chemical sprayed over the first farm field by the unmanned aerial vehicle 20 is scattered to the second farm field, the probability that the scattered agricultural chemical directly hits the crop in the second farm field is reduced.

Third Example of Decision Process

A third example of the decision process in step S103 described above will be described with reference to FIG. 6. As an outline, in the third example, the execution timing of agricultural chemical spraying over the first farm field by the unmanned aerial vehicle 20 differs depending on whether or not the second farm field meets the usage standard for the agricultural chemical to be sprayed over the first farm field. In the third example, it is assumed that the reservation information includes information indicating the agricultural chemical to be sprayed over the first farm field and/or the usage standard for the agricultural chemical. In addition, the information about each farm field includes information indicating the crop in the second farm field and/or the scheduled harvest timing.

Step S400: The controller 33 specifies the crop in the second farm field and/or a scheduled harvest timing thereof from the information about the second farm field stored in the storage 32.

Step S401: The controller 33 specifies a usage standard for the agricultural chemical to be sprayed over the first farm field from the reservation information of step S101 described above.

Specifically, when the reservation information includes information indicating the usage standard for the agricultural chemical, the controller 33 specifies the usage standard for the agricultural chemical from the reservation information. Alternatively, when the reservation information does not include information indicating the usage standard for the agricultural chemical, the controller 33 specifies the agricultural chemical from the reservation information and specifies the usage standard for the agricultural chemical by acquiring the agricultural chemical from an external server on the network 40 via the communicator 31. As described above, as the usage standard for the agricultural chemical, there are, for example, the crop for which the agricultural chemical is usable and the timing when the agricultural chemical is usable.

Step S402: The controller 33 determines whether or not the second farm field meets the usage standard for the agricultural chemical based on the information about the second farm field. When the determination is made that the second farm field meets the usage standard for the agricultural chemical (Yes in step S402), the process proceeds to step S403. On the other hand, when the determination is made that the second farm field does not meet the usage standard for the agricultural chemical (No in step S402), the process proceeds to step S404.

Specifically, when the crop in the second farm field does not correspond to the crop for which the agricultural chemical is usable, the controller 33 may determine that the second farm field does not meet the usage standard for the agricultural chemical. When the scheduled execution timing of agricultural chemical spraying over the first farm field does not correspond to the timing when the agricultural chemical is usable for the crop in the second farm field, the controller 33 may determine that the second farm field does not meet the usage standard for the agricultural chemical. On the other hand, when the crop in the second farm field correspond to crop for which the agricultural chemical is usable and the scheduled execution timing of agricultural chemical spraying over the first farm field corresponds to the timing when the agricultural chemical is usable for the crop in the second farm field, the controller 33 may determine that the second farm field meets the usage standard for the agricultural chemical.

In addition, depending on the agricultural chemical, just one of the crop for which the agricultural chemical is usable and the timing when the agricultural chemical is usable may be specified in the usage standard. In such a case, when the crop in the second farm field corresponds to the crop for which the agricultural chemical is usable or when the scheduled execution timing of agricultural chemical spraying over the first farm field corresponds to the timing when the agricultural chemical is usable for the crop in the second farm field, the controller 33 may determine that the second farm field meets the usage standard for the agricultural chemical.

Step S403: When the determination in step S402 is made that the second farm field meets the usage standard for the agricultural chemical (Yes in step S402), the controller 33 decides that the scheduled execution timing is the execution timing of agricultural chemical spraying over the first farm field by the unmanned aerial vehicle 20. Then, the process proceeds to step S104 as described above.

Step S404: When the determination in step S402 is made that the second farm field does not meet the usage standard for the agricultural chemical (No in step S402), the controller 33 decides the execution timing of agricultural chemical spraying over the first farm field by the unmanned aerial vehicle 20 to be later than the scheduled harvest timing specified in step S400. Then, the process proceeds to step S104 as described above.

As described above, according to the decision process according to the third example, when the determination is made that the second farm field meets the usage standard for the agricultural chemical, the scheduled execution timing indicated in the reservation information is decided as the execution timing of agricultural chemical spraying over the first farm field as it is. Since the second farm field meets the usage standard for the agricultural chemical, even when the agricultural chemical sprayed over the first farm field by the unmanned aerial vehicle 20 is scattered to the second farm field before the crop in the second farm field are harvested, the probability that the agricultural chemical adversely affects the crop in the second farm field is low.

On the other hand, when the determination is made that the second farm field does not meet the usage standard for the agricultural chemical, the execution timing of agricultural chemical spraying over the first farm field is decided to be later than the scheduled harvest timing of the crop in the second farm field. Therefore, there is a high probability that harvesting of the crop in the second farm field have been completed before the agricultural chemical is sprayed over the first farm field, and thus, even when the agricultural chemical sprayed over the first farm field by the unmanned aerial vehicle 20 is scattered to the second farm field, the probability that the scattered agricultural chemical adheres to the crop in the second farm field is reduced.

As described above, the information processing device 30 according to the present embodiment acquires information about each of a plurality of fields. Then, the information processing device 30 decides the execution timing of the agricultural chemical spraying over the first farm field to be sprayed with the agricultural chemical by the unmanned aerial vehicle 20 based on the information about the second farm field located around the first farm field.

According to the configuration, the execution timing of agricultural chemical spraying over the first farm field by the unmanned aerial vehicle 20 is decided based on the information about the second farm field. For example, when the decision is made that the execution timing of agricultural chemical spraying over the first farm field is to come, for example, after harvesting of the crop in the second farm field has been completed or later than a scheduled harvest timing of the crop in the second farm field, the probability that the scattered agricultural chemical adheres to the crop in the second farm field is reduced. Therefore, according to the present embodiment, even when the agricultural chemical sprayed over the first farm field by the unmanned aerial vehicle 20 is scattered to the second farm field, the probability that the scattered agricultural chemical adversely affects the crop in the second farm field is reduced, and in this respect, the technique of spraying an agricultural chemical over a farm field by using unmanned aerial vehicles 20 is improved.

Although the disclosure has been described with reference to drawings and examples, it should be noted that various variations and modifications may be made by those skilled in the art based on the disclosure. Therefore, it should be noted that the variations and modifications fall within the scope of the disclosure. For example, functions included in each component or each step can be rearranged so as not to be logically inconsistent, and multiple components or steps can be combined together or separated.

For example, in the above-described embodiment, an embodiment is also possible in which the configuration and operation of the information processing device 30 are distributed to a plurality of computers that can communicate with each other.

Further, an embodiment is also possible in which, for example, a general-purpose computer functions as the information processing device 30 according to the above-described embodiment. Specifically, a program describing processing details for carrying out each function of the information processing device 30 according to the above-described embodiment is stored in a memory of a general-purpose computer, and the program is read and executed by the processor. Therefore, the disclosure can also be implemented as a processor-executable program or a non-transitory computer-readable medium that stores the program.

Further, in the above-described embodiment, the operation of the information processing device 30 for executing the decision process has been specifically described with reference to the first to third examples. However, the information processing device 30 for executing the decision process may execute the decision process by appropriately combining the operations described in the first to third examples.

For example, the controller 33 of the information processing device 30 may decide that the scheduled execution timing indicated in the reservation information is the execution timing of agricultural chemical spraying over the first farm field as it is (similar to step S203 of the first example or step S403 of the third example), when the determination is made that harvesting of the crop in the second farm field has been completed (similar to Yes in step S202 of the first example), or when the determination is made that the second farm field meets the usage standard for the agricultural chemical (similar to Yes in step S402 of the third example). On the other hand, the controller 33 may decide the execution timing of agricultural chemical spraying over the first farm field by the unmanned aerial vehicle 20 to be later than the scheduled harvest timing of the second farm field (similar to step S301 of the second example or step S404 of the third example), when the determination is made that harvesting of the crop in the second farm field has not been completed (similar to No in step S202 of the first example) and when the determination is made that the second farm field does not meet the usage standard for the agricultural chemical (similar to No in step S402 of the third example).

Some of the embodiments of the disclosure are illustrated below. However, it should be noted that embodiments of the disclosure are not limited to the following appendices.

APPENDIX 1

An information processing method executed by an information processing device configured to decide an execution timing of agricultural chemical spraying by an unmanned aerial vehicle includes acquiring information about each of a plurality of farm fields and deciding an execution timing of agricultural chemical spraying over a first farm field to be sprayed by the unmanned aerial vehicle based on information about a second farm field located around the first farm field.

APPENDIX 2

In the information processing method according to appendix 1, the information about each farm field may include information indicating whether or not harvesting of a crop in the farm field has been completed, the information processing method may include acquiring information indicating a scheduled execution timing of agricultural chemical spraying over the first farm field by the unmanned aerial vehicle, and the information processing device may be configured to decide that the scheduled execution timing is the execution timing of agricultural chemical spraying over the first farm field by the unmanned aerial vehicle when harvesting of a crop in the second farm field has been completed.

APPENDIX 3

In the information processing method according to appendix 2, the information processing method may include transmitting, to a manager of the second farm field, a message requesting that harvesting of the crop in the second farm field is to be completed before the scheduled execution timing when harvesting of the crop in the second farm field has not been completed.

APPENDIX 4

In the information processing method according to appendix 3, the information processing method may include giving a reward to the manager of the second farm field when the manager of the second farm field responds to the request of the message.

APPENDIX 5

In the information processing method according to any one of appendix 1 to appendix 4, the information about each farm field may include information indicating a scheduled harvest timing of the crop in the farm field, and the information processing device may be configured to decide the execution timing of agricultural chemical spraying over the first farm field by the unmanned aerial vehicle to be later than a scheduled harvest timing of the crop in the second farm field.

APPENDIX 6

In the information processing method according to appendix 5, the information about each farm field may include information indicating the crop in the farm field, the information processing method may include acquiring information indicating a crop for which an agricultural chemical to be sprayed over the first farm field is usable, and the information processing device may be configured to decide the execution timing of agricultural chemical spraying over the first farm field by the unmanned aerial vehicle to be later than the scheduled harvest timing of the crop in the second farm field when the crop in the second farm field does not correspond to the crop for which the agricultural chemical is usable.

APPENDIX 7

In the information processing method according to appendix 5 or 6, the information processing method may include acquiring information indicating a scheduled execution timing of agricultural chemical spraying over the first farm field by the unmanned aerial vehicle and information indicating a timing when an agricultural chemical to be sprayed over the first farm field is usable for the crop, and the information processing device may be configured to decide the execution timing of agricultural chemical spraying over the first farm field by the unmanned aerial vehicle to be later than the scheduled harvest timing of the crop in the second farm field when the scheduled execution timing does not correspond to the timing when the agricultural chemical is usable for the crop in the second farm field.

APPENDIX 8

A non-transitory storage medium stores instructions that are executable by one or more processors in an information processing device configured to decide an execution timing of agricultural chemical spraying by an unmanned aerial vehicle and that cause the one or more processors to perform the following functions, and the functions include acquiring information about each of a plurality of farm fields and deciding an execution timing of agricultural chemical spraying over a first farm field to be sprayed by the unmanned aerial vehicle based on information about a second farm field located around the first farm field.

APPENDIX 9

In the non-transitory storage medium according to appendix 8, the information about each farm field may include information indicating whether or not harvesting of a crop in the farm field has been completed, the functions may include acquiring information indicating a scheduled execution timing of agricultural chemical spraying over the first farm field by the unmanned aerial vehicle, and the information processing device may be configured to decide that the scheduled execution timing is the execution timing of agricultural chemical spraying over the first farm field by the unmanned aerial vehicle when harvesting of a crop in the second farm field has been completed.

APPENDIX 10

In the non-transitory storage medium according to appendix 9, the functions may include transmitting, to a manager of the second farm field, a message requesting that harvesting of the crop in the second farm field is to be completed before the scheduled execution timing when harvesting of the crop in the second farm field has not been completed.

APPENDIX 11

In the non-transitory storage medium according to appendix 10, the functions may include giving a reward to the manager of the second farm field when the manager of the second farm field responds to the request of the message.

APPENDIX 12

In the non-transitory storage medium according to any one of appendix 8 to appendix 11, the information about each farm field may include information indicating a scheduled harvest timing of the crop in the farm field, and the information processing device may be configured to decide the execution timing of agricultural chemical spraying over the first farm field by the unmanned aerial vehicle to be later than a scheduled harvest timing of the crop in the second farm field.

APPENDIX 13

In the non-transitory storage medium according to appendix 12, the information about each farm field may include information indicating the crop in the farm field, the functions may include acquiring information indicating a crop for which an agricultural chemical to be sprayed over the first farm field is usable, and the information processing device may be configured to decide the execution timing of agricultural chemical spraying over the first farm field by the unmanned aerial vehicle to be later than the scheduled harvest timing of the crop in the second farm field when the crop in the second farm field does not correspond to the crop for which the agricultural chemical is usable.

APPENDIX 14

In the non-transitory storage medium according to appendix 12 or appendix 13, the functions may include acquiring information indicating a scheduled execution timing of agricultural chemical spraying over the first farm field by the unmanned aerial vehicle and information indicating a timing when an agricultural chemical to be sprayed over the first farm field is usable for the crop, and the information processing device may be configured to decide the execution timing of agricultural chemical spraying over the first farm field by the unmanned aerial vehicle to be later than the scheduled harvest timing of the crop in the second farm field when the scheduled execution timing does not correspond to the timing when the agricultural chemical is usable for the crop in the second farm field.

APPENDIX 15

An information processing device configured to decide an execution timing of agricultural chemical spraying by an unmanned aerial vehicle includes a processor, and the processor is configured to acquire information about each of a plurality of farm fields, and is configured to decide an execution timing of agricultural chemical spraying over a first farm field to be sprayed by the unmanned aerial vehicle based on information about a second farm field located around the first farm field.

APPENDIX 16

In the information processing device according to appendix 15, the information about each farm field may include information indicating whether or not harvesting of a crop in the farm field has been completed, and the processor may be is configured to acquire information indicating a scheduled execution timing of agricultural chemical spraying over the first farm field by the unmanned aerial vehicle, and may be configured to decide that the scheduled execution timing is the execution timing of agricultural chemical spraying over the first farm field by the unmanned aerial vehicle when harvesting of a crop in the second farm field has been completed.

APPENDIX 17

In the information processing device according to appendix 16, the processor may be configured to transmit, to a manager of the second farm field, a message requesting that harvesting of the crop in the second farm field is to be completed before the scheduled execution timing via a communicator when harvesting of the crop in the second farm field has not been completed.

APPENDIX 18

In the information processing device according to appendix 17, the processor may be configured to execute a process of giving a reward to the manager of the second farm field when the manager of the second farm field responds to the request of the message.

APPENDIX 19

In the information processing device according to any one of appendix 15 to appendix 18, the information about each farm field may include information indicating a scheduled harvest timing of the crop in the farm field, and the processor may be configured to decide the execution timing of agricultural chemical spraying over the first farm field by the unmanned aerial vehicle to be later than a scheduled harvest timing of the crop in the second farm field.

APPENDIX 20

In the information processing device according to appendix 19, the information about each farm field may include information indicating the crop in the farm field, the processor may be configured to acquire information indicating a crop for which an agricultural chemical to be sprayed over the first farm field is usable, and may be configured to decide the execution timing of agricultural chemical spraying over the first farm field by the unmanned aerial vehicle to be later than the scheduled harvest timing of the crop in the second farm field when the crop in the second farm field does not correspond to the crop for which the agricultural chemical is usable.

What is claimed is:

1. An information processing method executed by an information processing device configured to decide an execution timing of agricultural chemical spraying by an unmanned aerial vehicle, the information processing method comprising:

acquiring information about each of a plurality of farm fields;

deciding an execution timing of agricultural chemical spraying over a first farm field of the plurality of farm fields to be sprayed by the unmanned aerial vehicle based on information about a second farm field of the plurality of farm fields located around the first farm field; and transmitting a signal to the unmanned aerial vehicle to cause the unmanned aerial vehicle to automatically perform the agricultural chemical spraying over the first farm field at the decided execution timing, wherein the information processing method further comprises acquiring information indicating a scheduled execution timing of agricultural chemical spraying over the first farm field by the unmanned aerial vehicle, the information about each of the plurality of farm fields includes information indicating whether or not harvesting of a crop in each of the plurality of farm fields has been completed, and the information processing device is configured to decide that the scheduled execution timing is the execution timing of agricultural chemical spraying over the first farm field by the unmanned aerial vehicle when harvesting of the crop in the second farm field has been completed.

2. The information processing method according to claim 1, further comprising transmitting, to a manager of the second farm field, a message requesting that harvesting of the crop in the second farm field is to be completed before the scheduled execution timing when harvesting of the crop in the second farm field has not been completed.

3. The information processing method according to claim 2, further comprising giving a reward to the manager of the second farm field when the manager of the second farm field responds to a request of the message.

4. The information processing method according to claim 1, wherein:

the information about each of the plurality of farm fields further includes information indicating a scheduled harvest timing of the crop in each of the plurality of farm fields; and the information processing device is configured to decide the execution timing of agricultural chemical spraying over the first farm field by the unmanned aerial vehicle to be later than a scheduled harvest timing of the crop in the second farm field.

5. The information processing method according to claim 4, further comprising acquiring information indicating the crop in the first farm field, for which an agricultural chemical to be sprayed over the first farm field is usable, wherein:

the information about each of the plurality of farm fields includes information indicating the crop in each of the plurality of farm fields; and the information processing device is configured to decide the execution timing of agricultural chemical spraying over the first farm field by the unmanned aerial vehicle to be later than the scheduled harvest timing of the crop in the second farm field when the crop in the second farm field does not correspond to the crop for which the agricultural chemical is usable.

6. The information processing method according to claim 1, wherein the signal is transmitted to the unmanned aerial vehicle by a communicator of the information processing device, the communicator includes a communication interface configured to connect to a network, and the communication interface corresponds to at least one of a mobile communication standard, a wired local area network (LAN) standard, or a wireless LAN standard.

7. The information processing method according to claim 4, further comprising acquiring information indicating a timing when an agricultural chemical to be sprayed over the first farm field is usable for the crop in the first farm field, wherein the information processing device is configured to decide the execution timing of agricultural chemical spraying over the first farm field by the unmanned aerial vehicle to be later than the scheduled harvest timing of the crop in the second farm field when the scheduled execution timing does not correspond to the timing when the agricultural chemical is usable for the crop in the second farm field.

8. A non-transitory storage medium storing instructions that are executable by one or more processors in an information processing device configured to decide an execution timing of agricultural chemical spraying by an unmanned aerial vehicle and that cause the one or more processors to perform:

acquiring information about each of a plurality of farm fields;

deciding an execution timing of agricultural chemical spraying over a first farm field of the plurality of farm fields to be sprayed by the unmanned aerial vehicle based on information about a second farm field of the plurality of farm fields located around the first farm field; and transmitting a signal to the unmanned aerial vehicle to cause the unmanned aerial vehicle to automatically perform the agricultural chemical spraying over the first farm field at the decided execution timing, wherein the instructions, when executed by the one or more processors, further cause the one or more processors to perform acquiring information indicating a scheduled execution timing of agricultural chemical spraying over the first farm field by the unmanned aerial vehicle on the information processing device, the information about each of the farm fields includes information indicating whether or not harvesting of a crop in each of the plurality of farm fields has been completed; and the one or more processors are configured to decide that the scheduled execution timing is the execution timing of agricultural chemical spraying over the first farm field by the unmanned aerial vehicle when harvesting of the crop in the second farm field has been completed.

9. The non-transitory storage medium according to claim 8, wherein the instructions, when executed by the one or more processors, further cause the one or more processors to perform transmitting, to a manager of the second farm field, a message requesting that harvesting of the crop in the second farm field is to be completed before the scheduled execution timing when harvesting of the crop in the second farm field has not been completed.

10. The non-transitory storage medium according to claim 9, wherein the instructions, when executed by the one or more processors, further cause the one or more processors to perform giving a reward to the manager of the second farm field when the manager of the second farm field responds to a request of the message.

11. The non-transitory storage medium according to claim 8, wherein:

the information about each of the plurality of farm fields further includes information indicating a scheduled harvest timing of the crop in each of the plurality of farm fields; and the one or more processors are configured to decide the execution timing of agricultural chemical spraying over the first farm field by the unmanned aerial vehicle to be later than a scheduled harvest timing of the crop in the second farm field.

12. The non-transitory storage medium according to claim 11, wherein the instructions, when executed by the one or more processors, further cause the one or more processors to perform acquiring information indicating the crop in the first farm field, for which an agricultural chemical to be sprayed over the first farm field is usable, wherein:

the information about each of the plurality of farm fields includes information indicating the crop in each of the plurality of farm fields; and the one or more processors are configured to decide the execution timing of agricultural chemical spraying over the first farm field by the unmanned aerial vehicle to be later than the scheduled harvest timing of the crop in the second farm field when the crop in the second farm field does not correspond to the crop for which the agricultural chemical is usable.

13. The non-transitory storage medium according to claim 8, wherein the signal is transmitted to the unmanned aerial vehicle by a communicator of the information processing device, the communicator includes a communication interface configured to connect to a network, and the communication interface corresponds to at least one of a mobile communication standard, a wired local area network (LAN) standard, or a wireless LAN standard.

14. The non-transitory storage medium according to claim 11, wherein the instructions, when executed by the one or more processors, further cause the one or more processors to perform acquiring information indicating a timing when an agricultural chemical to be sprayed over the first farm field is usable for the crop in the first farm field, wherein the one or more processors are configured to decide the execution timing of agricultural chemical spraying over the first farm field by the unmanned aerial vehicle to be later than the scheduled harvest timing of the crop in the second farm field when the scheduled execution timing does not correspond to the timing when the agricultural chemical is usable for the crop in the second farm field.

15. An information processing device configured to decide an execution timing of agricultural chemical spraying by an unmanned aerial vehicle, the information processing device comprising a communicator and a processor to:

acquire information about each of a plurality of farm fields;

decide an execution timing of agricultural chemical spraying over a first farm field of the plurality of farm fields to be sprayed by the unmanned aerial vehicle based on information about a second farm field of the plurality of farm fields located around the first farm field; and cause the communicator to transmit a signal to the unmanned aerial vehicle to cause the unmanned aerial vehicle to automatically perform the agricultural chemical spraying over the first farm field at the decided execution timing, wherein the processor is configured to acquire information indicating a scheduled execution timing of agricultural chemical spraying over the first farm field by the unmanned aerial vehicle, the information about each of the plurality of farm fields includes information indicating whether or not harvesting of a crop in each of the plurality of farm fields has been completed, and the processor is configured to decide the scheduled execution timing as the execution timing of agricultural chemical spraying over the first farm field by the unmanned aerial vehicle when harvesting of the crop in the second farm field has been completed.

16. The information processing device according to claim 15, wherein the processor is configured to cause the communicator to transmit, to a manager of the second farm field, a message requesting that harvesting of the crop in the second farm field is to be completed before the scheduled execution timing when harvesting of the crop in the second farm field has not been completed.

17. The information processing device according to claim 16, wherein the processor is configured to execute a process of giving a reward to the manager of the second farm field when the manager of the second farm field responds to a request of the message.

18. The information processing device according to claim 15, wherein the information about each of the plurality of farm fields further includes information indicating a scheduled harvest timing of the crop in each of the plurality of farm fields; and the processor is configured to decide the execution timing of agricultural chemical spraying over the first farm field by the unmanned aerial vehicle to be later than a scheduled harvest timing of the crop in the second farm field.

19. The information processing device according to claim 18, wherein:

the information about each of the plurality of farm fields includes information indicating the crop in each of the plurality of farm fields; and the processor is configured to acquire information indicating the crop in the first farm field, for which an agricultural chemical to be sprayed over the first farm field is usable; and the processor is configured to decide the execution timing of agricultural chemical spraying over the first farm field by the unmanned aerial vehicle to be later than the scheduled harvest timing of the crop in the second farm field when the crop in the second farm field does not correspond to the crop for which the agricultural chemical is usable.

20. The information processing device according to claim 15, wherein the communicator includes a communication interface configured to connect to a network, and the communication interface corresponds to at least one of a mobile communication standard, a wired local area network (LAN) standard, or a wireless LAN standard.

* * * * *